June 21, 1966    E. F. WELLER, JR    3,257,627
PULSE AMPLITUDE MODULATING SYSTEM
Filed Aug. 12, 1963
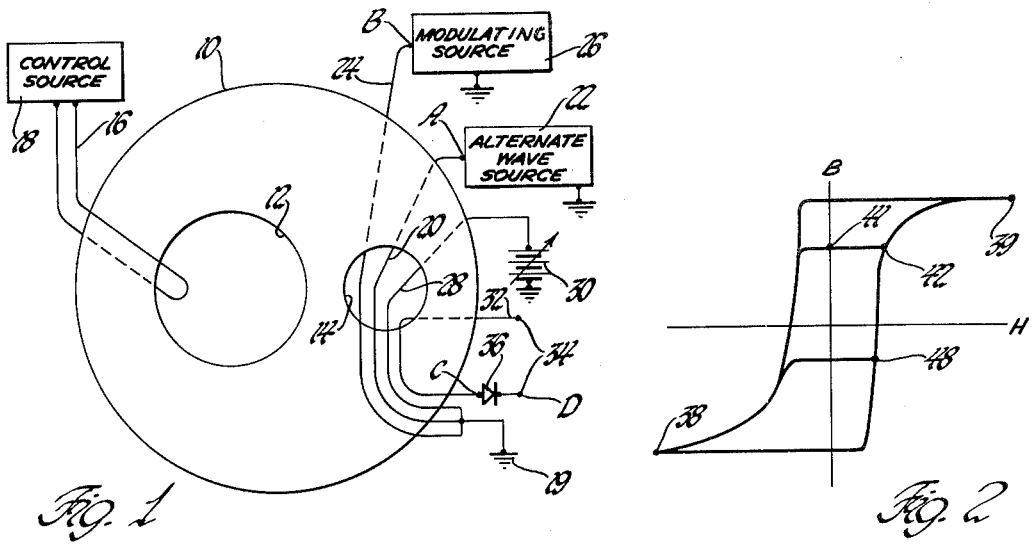
Fig. 1
Fig. 2
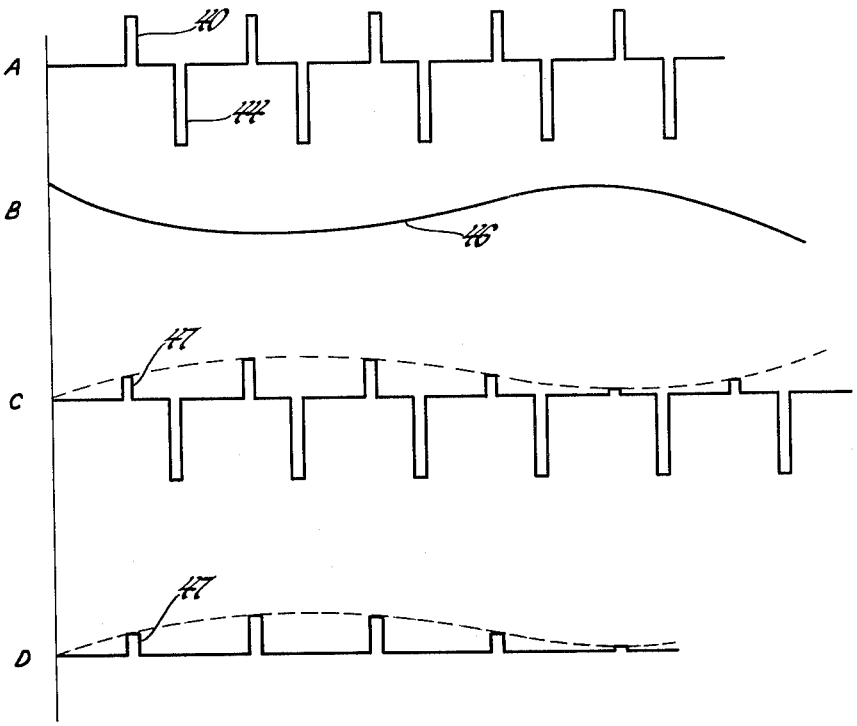
Fig. 3
INVENTOR.
Edward F. Weller, Jr.
BY
Paul J. Ethington
ATTORNEY

United States Patent Office 3,257,627
Patented June 21, 1966

3,257,627
PULSE AMPLITUDE MODULATING SYSTEM
Edward F. Weller, Jr., Birmingham, Mich., assignor to General Motors Corporation, Detroit, Mich., a corporation of Delaware
Filed Aug. 12, 1963, Ser. No. 301,329
9 Claims. (Cl. 332—12)

This invention relates to a system for producing amplitude modulated pulses and, more particularly, to such a system as includes a solid state magnetic core device.

It is well known that a train of amplitude modulated voltage pulses may be produced by a system including a vacuum tube such as a triode having carrier and modulating signals connected to respective electrodes. Such a system naturally requires various connecting resistors and power supplies and is subject to breakdown due to tube failure. In accordance with the present invention a pulse amplitude modulated waveform may be produced by a rugged and reliable system which includes a body of magnetic material having two stable states of magnetic flux saturation into which the material may be switched by proper driving signals. In other words, the material exhibits a substantially square hysteresis loop. At least one aperture is formed in the body to define a continuous flux path around the aperture. In addition, a plurality of windings are threaded through the aperture so as to link the flux path. More particularly, a first winding is connected to a carrier signal source which produces a waveform of relatively rapidly alternating polarity. The amplitude of one polarity of the carrier signal is chosen to be sufficient to switch the flux path to one of the stable states of magnetic saturation and the amplitude of the other polarity tends to switch the flux path toward the opposite state of magnetic saturation. A second winding links the flux path and is connected to a modulating signal source which produces signals in the second winding of relatively slowly varying amplitude and which tend to modulate the magnetomotive driving force of the signals in the first winding which are of the polarity tending to drive the flux path toward said other stable state. Accordingly, the signals in the modulating winding, or second winding, tend to restrict the extent to which the flux flow in the path changes from one stable state to the other. Finally, an output winding links the flux path such that voltage signals are produced therein which correspond to the magnitude and direction of the flux changes in the path. If it is desired to restrict the usable output to pulses of one polarity, rectifier means such as a diode may be connected in series with the output winding so as to eliminate the voltage pulses which are produced upon driving the flux path to the first stable state. The output voltages are thus limited to amplitude modulated pulses which result from the modulated flux change produced by the combination of the carrier and modulation signals.

An additional feature of the invention includes a system whereby the pulse amplitude modulated output signal may be turned on and off in accordance with a control signal. Briefly described, this system may be accomplished by means of a magnetic body as described above and including an additional aperture which defines a control, or primary flux path. The second aperture is adjacent the first aperture such that the control flux path links the above described flux path in a common portion of the body. A control signal source may be connected to the winding linking the control flux path to switch the direction of magnetic flux saturation in the second flux path thereby to block or unblock the above-described flux path.

The invention may be best understood by referring to the following specification which is to be taken with the accompanying drawings of which:

FIGURE 1 is a schematic diagram of a particular embodiment of the invention;
FIGURE 2 illustrates a preferred magnetic characteristic for the embodiment of FIGURE 1; and
FIGURE 3 illustrates the signal waveforms which appear at various points in the embodiment of FIGURE 1.

Referring to FIGURE 1, the illustrative embodiment of the invention includes a disc-shaped body 10 of magnetic material such as ferrite. This material exhibits a substantially square magnetic characteristic or hysteresis loop as shown in FIGURE 2. Material having such a magnetic characteristic may be switched into stable flux flow conditions which persist after the removal of the driving force. As is well known to those skilled in the art, a squareness ratio of approximately 0.95 is presently attainable. A large primary aperture 12 is formed in the body 10 to define a first continuous flux path which surrounds the aperture 12. A second somewhat smaller aperture 14 is also formed in the body 10 adjacent the aperture 12 thereby to define a second continuous flux path which surrounds the aperture 14. As indicated, the flux path surrounding the larger aperture 12 intersects the flux path surrounding aperture 14. A control winding 16 is threaded through the aperture 12 to link the flux path defined thereby and is connected to a control source 18. The source 18 may be adapted to produce controlled amplitude pulses of either positive or negative polarity which are effective to determine the direction of remanent flux around the path defined by aperture 12. A plurality of windings are threaded through the aperture 14 to link the flux path defined thereby. This plurality of windings includes a carrier winding 20 which is connected to a relatively high frequency alternating current source 22. A second winding 24 threaded through aperture 14 is connected to a modulating signal source 26. The source 26 produces a relatively slowly varying current signal in winding 24 which modulates the carrier signal appearing on winding 20 in a manner described in the following. A third winding 28 may be provided linking the flux path defined by aperture 14. The winding 28 may be connected to a variable magnitude D.C. source 30 thereby to act as a bias which determines that portion of the hysteresis loop of FIGURE 2 over which the present system will operate. Finally, an output winding 32 links the flux path defined by aperture 14 and is connected to a pair of output terminals 34 on which appear signals corresponding to the flux changes in the path defined by aperture 14. As indicated, a rectifying device such as diode 36 may be connected in circuit with output winding 32 to eliminate voltage pulses of a selected polarity. As further indicated, all the windings 20, 24 and 28 may be commonly connected to ground 19, as are the sources 22, 26 and 30.

In describing the operation of the device, reference will be taken to FIGURES 2 and 3 which are illustrative of the current and magnetic flux signals appearing in the system of FIGURE 1. Dealing for the moment only with the flux path defined by aperture 14, it can be seen that if an alternating waveform such as is illustrated on line A of FIGURE 3 is applied to winding 20 by the source 22, the magnetic flux in the path surrounding aperture 14 will be alternately driven in opposite directions. It may be arbitrarily assumed that negative saturation corresponds with clockwise flux flow and is defined by a point 38 in the hysteresis loop of FIGURE 2. If the magnetic state of the flux path defined by aperture 14 is that of negative saturation it can be seen that in the absence of signals on either of the windings 24 and 28, a positive pulse 40 occurring in winding 20 tends to produce flux in a counterclockwise direction around aperture 14. This counterclockwise flux flow tends to move the magnetic state of the flux path toward the positive saturation condition defined by point 39 in FIGURE 2. The amplitude of the pulse 40 may be chosen to move the magnetic state of body 10 through only a portion of the curve to a point 42 on the hysteresis loop with the magnitude of flux change corresponding, of course, to the distance from point 38 to point 42. At the end of the pulse 40, the flux remains in a condition indicated by point 41 in FIGURE 2. A following negative pulse 44 on winding 20 reverses the flux condition and returns the flux path to point 38, as shown in FIGURE 2. Accordingly, the magnitude of the negative pulses on line A of FIGURE 3 is chosen to be sufficient to return the flux path defined by aperture 14 to the negative saturation point 38 regardless of the magnitude of positive remanent flux. It can be seen that the alternating positive and negative pulses such as 40 and 44, respectively, cause corresponding flux changes in the path defined by aperture 14. Accordingly, voltage pulses are induced in the output winding 32 which correspond in magnitude to the flux changes about the aperture 14. By connecting a diode 36 in series circuit with the winding 32 the output signals appearing across terminal 34 may be limited to only those pulses which are produced by positive pulses from the source 22.

The flux changes which occur in the path defined by aperture 14 due to the positive pulses such as 40 on line A of FIGURE 3 may be effectively modulated by a relatively slowly varying signal waveform 46 as shown on line B of FIGURE 3. The waveform 46 may be produced by the modulating source 26 and thereby induce a corresponding current waveform in winding 24. The source 26 may, of course, be subject to control by some external influence not of importance here. As indicated, the waveform 46 appearing on winding 24 produces flux which tends to magnetically oppose the flux produced by the positive pulses of the waveform of line A of FIGURE 3. Accordingly, the positive pulse 40 of line A of FIGURE 3, when opposed by the relatively slowly varying signal waveform 46, is effective to move the magnetic condition along the hysteresis loop to a point 48 which, as indicated, represents only a portion of the total flux change which is available. Since the amplitude of the signal appearing across output terminals 34 is directly related to the extent of the flux change of the path defined by aperture 14, the positive output pulse 47 of FIGURE 3C, which is produced by pulse 40, is amplitude modulated. Accordingly, the equal amplitude positive pulses of line A, FIGURE 3, produce output pulses which are amplitude modulated in accordance with an envelope defined by waveform 46 of line B, FIGURE 3. This is effectively shown on line C of FIGURE 3. As noted, the polarity of waveform 46 is such in this instance as to amplitude modulate only the positive pulses. Accordingly, the negative voltage pulses such as 44 are effective to return the magnetic state to the point 38 of FIGURE 2 periodically. As shown on line D of FIGURE 3, the diode 36 restricts the output signal appearing across terminals 34 to the amplitude modulated positive pulses.

It will be understood by those skilled in the art that the alternating waveform produced by source 22 is not necessarily restricted to the alternating positive and negative square pulses as shown on line A of FIGURE 3. As is known in the art, a sinusoidally alternating current waveform of sufficiently high frequency is also effective to produce alternating positive and negative voltage pulses in an output winding linking the flux path. The present invention is thus equally operable with a relatively high frequency alternating waveform used in place of the waveform of FIGURE 3A.

In order to obtain fine control on the amplitude of the output pulses shown on line D, FIGURE 3, the bias winding 28 may be connected to the variable D.C. source 30 to set the point on the hysteresis loop of FIGURE 2 around which the system will operate. By this means it is possible to carefully regulate the minimum and maximum amplitudes which are desirable in the output waveform.

FIGURE 1 illustrates, in addition, a simple means by which the pulse amplitude modulating system may be effectively switched on and off in accordance with a control signal. As previously stated, the flux path defined by aperture 12 intersects and includes the flux path defined by aperture 14 to a substantial degree. Due to the relative sizes of the apertures 12 and 14 and the length of the flux paths defined thereby, control signals from source 18 induced in winding 16 are effective according to polarity to block or unblock the flux path defined by aperture 14. For example, a current pulse may be conducted through winding 16 in a direction to produce a counterclockwise flux flow which saturates the body 10 in the area adjacent the aperture 14. Due to the substantially square hysteresis loop, the body 10 remains saturated after the termination of the pulse. Since the area between apertures 12 and 14 is blocked or saturated, no flux flow due to the alternating waveform of line A, FIGURE 3, is possible and no output signals appear across terminal 34. However, as is known to those skilled in the art, proportional flux reversal in a body such as 10 may be accompanied by a decreased current pulse in a winding such as 16. Therefore, a decreased amplitude current pulse tending to produce flux in a clockwise direction around aperture 12 may be induced in winding 16 to reverse the flux in only that portion of body 10 which extends radially outward from aperture 12 as far as the aperture 14. By this means only the portion of the body intermediate apertures 12 and 14 is reversed in flux direction. In this state, the flux path defined by aperture 14 is effectively unblocked and the alternating waveform from source 22 along with the modulating waveform from source 26 is able to produce a flux change in the path around aperture 14. Output signals thus occur across terminal 34.

In operation, the system as above described may be easily switched on by unblocking the portion of the body 10 which lies intermediate apertures 12 and 14 and turned off by blocking this same portion of the body 10.

It is to be understood that various modifications in the invention may occur to those skilled in the art, and the invention is not to be limited by the above description. For a definition of the invention, reference should be had to the appended claims.

What is claimed is:

1. A device for producing an amplitude modulated pulse train comprising: a body of magnetic material, the material having two stable states of magnetic flux saturation, a continuous flux path defined by an aperture in the body, a first winding linking the flux path, a carrier signal source connected to the first winding for producing a waveform which reverses in polarity relatively rapidly, the amplitude of one polarity of the waveform being sufficient to drive the flux path to one of the stable states, the amplitude of the other polarity being less than said amplitude of one polarity and tending to drive the flux path toward the other stable state, a second winding linking the flux path, a modulating signal source connected to the second winding for producing a modulating signal of relatively slowly varying amplitude, the modulating signal being of a sense which tends to produce flux in the path opposite in direction to the flux produced by the other polarity of the waveform and of an amplitude less than that required to saturate the path, and an output winding linking the path to produce an output signal which corresponds to the changes in flux in the path.

2. A device as defined by claim 1 including a bias winding linking the flux path and a source of variable amplitude current connected to the bias winding.

3. A device as defined in claim 1 including rectifier means connected in series circuit with the output winding to eliminate voltages of a selected polarity in the signal appearing across the output winding.

4. A device as defined in claim 3 wherein the waveform takes the form of alternating positive and negative current pulses of equal duration.

5. A switch comprising: a body of magnetic material having two stable states of magnetic flux saturation, a first continuous flux path defined by a first aperture in the body, a second continuous flux path defined by a second aperture in the body, the first and second flux paths intersecting at a common portion of said body, a control winding linking the first flux path and being connected to a signal source, the source being effective to control the direction of flux in the first flux path thereby to block and unblock the second path to flux flow, a first winding linking the second flux path; means connected to the first winding for producing a waveform which reverses polarity relatively rapidly, the amplitude of one polarity of the waveform being sufficient to drive the second flux path to one of the stable states when unblocked, the other polarity being of lesser amplitude than said one polarity and tending to drive the second path toward the other stablee state, a second winding linking the second flux path; means for producing a relatively slowly varying signal in the second winding which is in magnetic opposition to said other polarity thereby to modulate the extent to which said other polarity drives the second path toward the other stable state, and an output winding linking the second flux path to produce output signals corresponding in magnitude to the flux changes in the second path.

6. A device as defined in claim 4 including a bias winding linking the flux path and connected to a variable amplitude current source.

7. A device as defined by claim 5 including rectifier means connected in series circuit with the output winding.

8. A device as defined in claim 5 wherein the waveform takes the form of alternating positive and negative current pulses of equal duration.

9. Apparatus for producing amplitude modulated voltage pulses comprising a disc-shaped body of magnetic material having two stable states of magnetic flux separation, a primary flux path defined by a first aperture in the body, a secondary flux path defined by a second aperture in the body, the first flux path including the portion of the body adjacent the second aperture, a control winding linking the first flux path and being connected to a signal source, the source being effective to control the direction of flux in the first path thereby to block and unblock the second path to flux flow, a first winding linking the second flux path and being connected to a source for producing a train of pulses consisting of alternately positive and negative current pulses of equal duration, the amplitude of the negative pulses being sufficient to drive the second flux path to one of the stable states when unblocked and the positive pulses being of lesser amplitude than said negative pulses and tending to drive the second flux path toward the other signal state, a second winding linking the flux path and being connected to a source for producing a relatively slowly varying signal in the second winding which is in magnetic opposition to the signal produced by the positive pulses in the first winding thereby to modulate the extent to which the positive pulses drive the second path toward the other stable state, an output winding linking the second flux path to produce output signals corresponding in magnitude to the flux changes in the second path and rectifier means connected in series circuit with the output windings for eliminating output signals which are produced by driving the second flux path to said one of the stable states.

References Cited by the Examiner
UNITED STATES PATENTS

| 2,988,734 | 6/1961 | Samusenko | 331—181 X |
| 2,990,521 | 6/1961 | Tominaga | 332—51 |
| 3,007,120 | 10/1961 | Ferrar | 332—51 |
| 3,132,256 | 5/1964 | Giel | 332—12 X |
| 3,136,960 | 6/1964 | Ausfresser | 332—12 |
| 3,172,061 | 3/1965 | Malinowski | 332—12 |

HERMAN KARL SAALBACH, *Primary Examiner.*

P. GENSLER, *Assistant Examiner.*